United States Patent [19]

Flick

[11] 4,275,324

[45] Jun. 23, 1981

[54] DYNAMOELECTRIC MACHINE HAVING SHIELDED RETAINING RINGS

[75] Inventor: Carl Flick, Pittsburgh, Pa.

[73] Assignee: Westinghouse Electric Corp., Pittsburgh, Pa.

[21] Appl. No.: 71,632

[22] Filed: Aug. 31, 1979

[51] Int. Cl.³ .......................... H02K 3/46; H02K 3/48
[52] U.S. Cl. ..................................... 310/270; 310/214
[58] Field of Search ............... 310/183, 214, 262, 270, 310/58, 59, 61, 64, 260; 336/197

[56] References Cited

U.S. PATENT DOCUMENTS

| 957,290 | 5/1910 | Wright | 310/270 |
|---|---|---|---|
| 1,238,304 | 8/1917 | Kuyser | 310/183 |
| 1,262,774 | 4/1918 | Gilman | 310/183 |
| 2,833,944 | 5/1958 | Willyoung | 310/64 |
| 2,864,014 | 12/1958 | Schmitt | 310/64 |
| 3,075,104 | 1/1963 | Willyoung | 310/61 |
| 3,324,324 | 6/1967 | Richardson | 310/214 |
| 3,366,813 | 1/1968 | Madsen | 310/262 |

FOREIGN PATENT DOCUMENTS

| 573444 | 3/1933 | Fed. Rep. of Germany | 310/262 |
|---|---|---|---|
| 747065 | 3/1956 | United Kingdom | 310/270 |

*Primary Examiner*—R. Skudy
*Attorney, Agent, or Firm*—G. H. Telfer

[57] ABSTRACT

Surface currents are induced in dynamoelectric machine rotor body portions by negative sequence currents during unbalanced load operation. The surface currents are shunted away from retaining rings which are respectively situated on opposite axial ends of the rotor and function to restrain radial movement of conductor end turn portions which extend axially beyond the rotor's body portion. The retaining rings are shrink fitted on both ends of the rotor's body portion so as to structurally extend that body portion in both axial directions. Shunting the rotor surface currents away from the retaining rings provides an operating temperature therein of sufficiently low level to maintain high electrical joint integrity between the retaining ring and rotor. A mantle of highly conductive material surrounds both retaining rings in intimate electrical contact therewith. The mantle thickness is at least one-half depth of electrical current penetration for the rotor surface current's frequencies. The mantle is electrically connected to the rotor body portion preferably through interference fits with radial extensions of slot wedges which are situated in longitudinal slots formed in the rotor body radially outside electrical conductors disposed in those slots. The wedges constitute electrically conductive material and provide longitudinal electrical conductor retention in the rotor slots during high speed rotor rotation. Components joined through the interference fit include the mantle and the wedges' radial extensions. A material softer and of higher electrical conductivity than either of those joined components is preferably interposed as a plating material on either or both components.

9 Claims, 4 Drawing Figures

DYNAMOELECTRIC MACHINE HAVING SHIELDED RETAINING RINGS

BACKGROUND OF THE INVENTION

1. Field of the Invention

This invention relates to rotor structures of dynamoelectric machines, such as turbine generators, and in particular, to means for shunting currents induced in rotor surfaces by externally applied magnetic fields away from retaining rings situated at both ends of the rotor.

2. Description of the Prior Art

Generator rotors according to prior art include shaft and body portions of relatively small and large diameter, respectively. Longitudinal slots usually extend axially along the outer periphery of the rotor body. Longitudinal electrical conductor portions disposed in different rotor slots are normally interconnected at each axial end of the rotor body by end turn electrical conductor portions. The longitudinal conductor portions are radially restrained by wedges inserted in those slots radially outside the longitudinal electrical conductors. The end turn portions, on the other hand, are radially restrained during high speed rotor rotation by retaining ring structures which usually constitute high strength cylindrical members which are normally affixed to the rotor body's outer periphery through a shrink fitting process. Since the end turn portions lie radially beneath the retaining rings, centrifugal forces exerted on those end turn portions during rotor rotation are counteracted by internal forces in the retaining rings.

During normal service, central station turbine generators operate with substantially balanced polyphase (commonly three phase) loads. Generator operation is, however, sometimes required for unbalanced load whose duration may be continuous or short. An example of the latter is an unbalanced fault typically occurring as a line-to-line short circuit. During unbalanced load operation or unbalanced fault occurrence, stator windings of turbine generators or other dynamoelectric machines carry a system of currents, denoted in technical parlance as a negative-sequence system, which generates magnetomotive forces that rotate at the generator's synchronous speed in a direction opposite that of rotor rotation. Such magnetomotive forces induce currents in the conducting paths of the rotor (primarily at the surface) and at twice the line frequency. For example, such rotor induced currents for a 60 hertz generator have a frequency of 120 hertz. Analyzing the paths in which these induced surface currents flow in the complexly shaped, discontinuous rotor structure is a difficult task and has been the subject of much design effort.

The induced rotor surface currents travel in a substantially axial direction and eventually enter the rotor's retaining rings. High strength alloys which are customarily utilized for retaining rings usually have relatively high electrical resistance which causes substantial $I^2R$ heating losses. Additionally, since each retaining ring is normally joined (typically shrunk on) to the rotor body in its restraining configuration, heating losses therein tend to expand the retaining ring and reduce the shrink fit pressure between it and the rotor body. As such, the electrical connection between the retaining ring and the rotor body develops a higher resistance which leads to higher heating losses and further aggravates the undesirable situation. For a given load unbalance or fault, dynamoelectric machines of higher rating will usually sustain higher heating losses in the retaining rings and induce greater thermal expansion thereof.

Previous attempts by machine designers to minimize current flow in the retaining rings include the use of end amortisseur connecting bars or rings which are highly conductive damper members operationally disposed radially inside the retaining rings and radially outside the end turn portions. Use of such highly conductive dampers was thought to shunt the induced rotor surface currents away from the retaining rings and thus reduce their heating and minimize disadvantages resulting therefrom. However, recent studies indicate that use of such radially inner dampers may provide very little relief from the $I^2R$ heating affects of the induced rotor surface current on the retaining rings. Additional attempts to shield the retaining rings from induced rotor surface currents include U.S. Pat. No. 3,324,324 which issued June 6, 1967. Such structure shows insulation being interposed between the retaining rings and current carrying portions of the rotor body. Such structure, while reducing retaining ring heating, shunts the rotor surface current to other paths which are also vulnerable to overheating.

SUMMARY OF THE INVENTION

In accordance with the present invention, an improved dynamoelectric machine is provided for minimizing heating and thermal expansion of retaining rings joined to a rotor for restraining radial movement of conductor end turn portions during high speed rotor rotation. The improved dynamoelectric machine generally includes a cylindrical rotor body which has a plurality of longitudinal slots, an electrical winding including longitudinal portions and end turn portions which are respectively situated within the slots and at both axial ends of the rotor, a generally cylindrical retaining ring structure joined to each axial end of the rotor body in surrounding relationship with the end turn portions, a highly conductive mantle structure joined in intimate electrical contact with the radially outer surface of each retaining ring structure, and means in electrical parallel relationship with the retaining ring structure for electrically connecting the mantle structure and the rotor body's surface. The mantle structure's radial thickness has a preferable minimum of about one depth of penetration or skin thickness of electrical current penetration for electrical current induced on the rotor surface. The depth of penetration or skin thickness is a function of the induced rotor current's frequency and the mantle structure's material properties. The mantle thickness required to effectively shunt the rotor induced current away from the retaining rings increases for decreasing current frequency and decreasing mantle conductivity. The preferable minimum mantle radial thickness for a given material corresponds approximately to the skin thickness for the lowest common frequency (120 Hertz) for rotor surface induced currents, but smaller mantle thicknesses down to a minimum of about one-half skin thickness are effective in substantially reducing heating losses in the underlying retaining ring.

The electrical connection means in a preferred embodiment of the invention constitutes electrically conductive wedges which are receivable in the longitudinal slots radially outside the longitudinal conductor portions and have radial extensions which are contactable, along a radially outer surface thereof, with the mantle structures. To provide an optimum electrical connection between the wedge's radial extension's outer surfaces and the mantle structures a thin connecting member is disposable in intimate contact with the two joinable components. The thin, connecting member preferably constitutes a softer material of higher conductivity than the wedges or the mantle so as to accommodate any local asperities, which would otherwise limit the contact area and increase electrical contact resistance. An interference fit between the mantle's radial inner surface and the wedges' radial extensions' outer surfaces facilitates assembly and simplifies component fabrication. A cylindrical support member is preferably situated radially outside each mantle structure so as to maintain the mantle structure's integrity during high speed rotor rotation. For conductive cylindrical support members their radial thicknesses are preferably less than one depth of electrical current penetration for rotor surface induced current.

Use of highly conductive mantle structures and support members whose preferable respective thicknesses are approximately as great as and less than one skin thickness of electrical current penetration permits electrical current carrying domination of the mantle structures over that of the retaining ring structures. As such, the relatively lower electrically resistant mantle structures electrically shield the retaining rings, incur lower $I^2R$ heating losses, and avoid unfavorable consequences resulting from thermal expansion of the retaining rings.

BRIEF DESCRIPTION OF THE DRAWINGS

The invention will be more fully understood from the following detailed description of the preferred embodiment, taken in connection with the accompanying drawings in which.

DESCRIPTION OF THE PREFERRED EMBODIMENT

The present invention is concerned primarily with improved restraining means for conductor end turn portions disposed at both axial ends of dynamoelectric machine rotors. Accordingly, in the description which follows the invention is shown embodied in a large turbine generator. It should be understood, however, that the invention may be utilized as a conductor end turn portion restraining means in any dynamoelectric machine.

Figure 1:
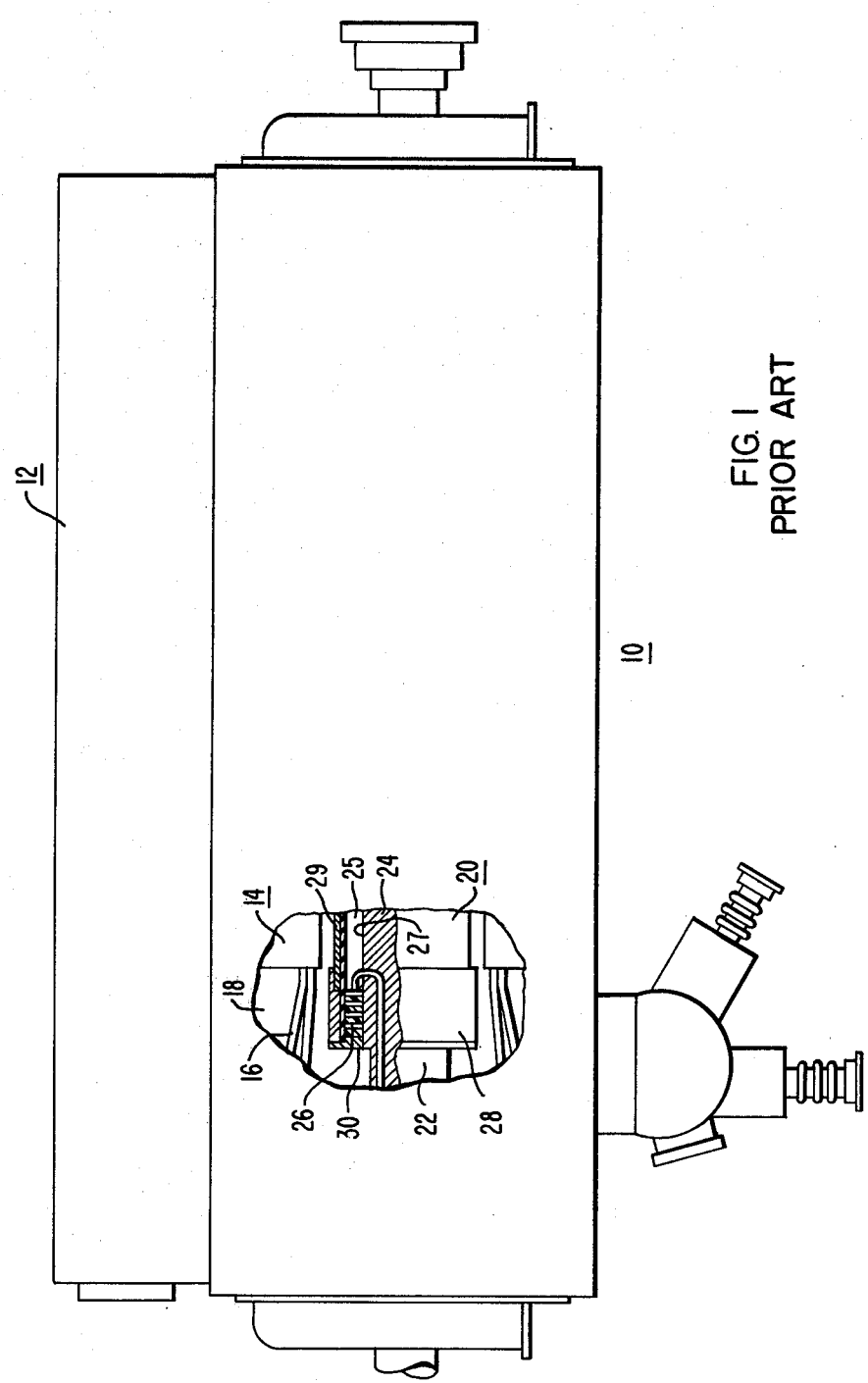
FIG. 1 is a transverse partial sectional view of a prior art exemplary turbine generator.

FIG. 1 is a partial transverse sectional view of a prior art exemplary turbine generator 10. While generator 10 is illustrated as being of gas cooled rotor construction, machines of multiphase capability having liquidly cooled rotors could utilize the present invention with equal facility.

Generator 10 includes an outer gas tight casing 12 which, in this case, is filled with a coolant gas normally constituting hydrogen. Generator 10 has a laminated stator core 14 of usual construction which is supported within casing 12 in any suitable manner. Stator core 14 is provided with longitudinal slots which receive high voltage stator winding coils 16. Stator winding coils 16 are suitably interconnected at both axial ends of stator 14 in end turn regions 18 to provide multiphase (normally three) operation.

Rotor structure 20 is suitably journaled and supported in casing 12 so as to be rotatable relative to stator core 14. Rotor structure 20 includes reduced diameter shaft portion 22 and conductor carrying rotor body portion 24. Field winding coils are disposed on rotor body portion 24 in such manner as to provide any suitable number of poles. Field winding coils constitute longitudinal portions 25 and end turn portions 26 which are respectively disposed in longitudinal slots 27 and end turn regions 18. The longitudinal conductor portions are radially restrained within slots 27 by slot wedges 29 which are cooperatively configured with slots 27 to prevent radial expulsion of wedges 29 therefrom during high speed rotor rotation and thus obstruct expulsion of the longitudinal winding portions 25 situated radially thereunder. The end turn portions 26 of the field winding extend axially beyond both axial ends of rotor body portion 24 into end turn regions 18 and electrically interconnect the longitudinal, slot-disposed portions 25 of the field winding.

Retaining ring structure 28 as shown in FIG. 1 is affixed to the end of rotor body 24 and is in radially restraining relationship with the field winding's end turn portions 26 to prevent radially outward movement thereof during high speed rotor rotation. Retaining ring end plate 30 augments the structural rigidity of retaining ring structure 28 so as to maintain the cylindrical shape thereof and axially restrain the end turn portions 26 adjacent rotor body 24. While only one axial end of rotor structure 20 has been illustrated and discussed, it is to be understood that for purposes of the present invention, the other axial end of rotor body portion 24 utilizes components 28 and 30 (retaining ring and retaining ring end plate respectively) for the same purposes.

During unbalanced load or fault operation, stator winding coils 16 carry a negative sequence system of currents which induce surface currents in conducting paths on the rotor body portion 24. Since retaining ring structure 28 is joined to rotor body portion 24, it carries the aforementioned surface current induced in rotor body portion 24. Since the retaining ring structure 28 is typically made of high strength, high resistivity, non-magnetic alloy steel, $I^2R$ heating losses from those induced currents flowing therethrough can become substantial. Such heating losses can cause thermal expansion of retaining ring structure 28 and reduce the electrical contact pressure between retaining ring structure 28 and rotor body portion 24. Such reduced electrical contact pressure causes increased resistance and increased thermal expansion of retaining ring structure 28 so as to further deteriorate the electrical integrity, increase the heating losses, and aggravate the already unfavorable current flow induced relationship between retaining ring structure 28 and rotor body 24.

Figure 2:
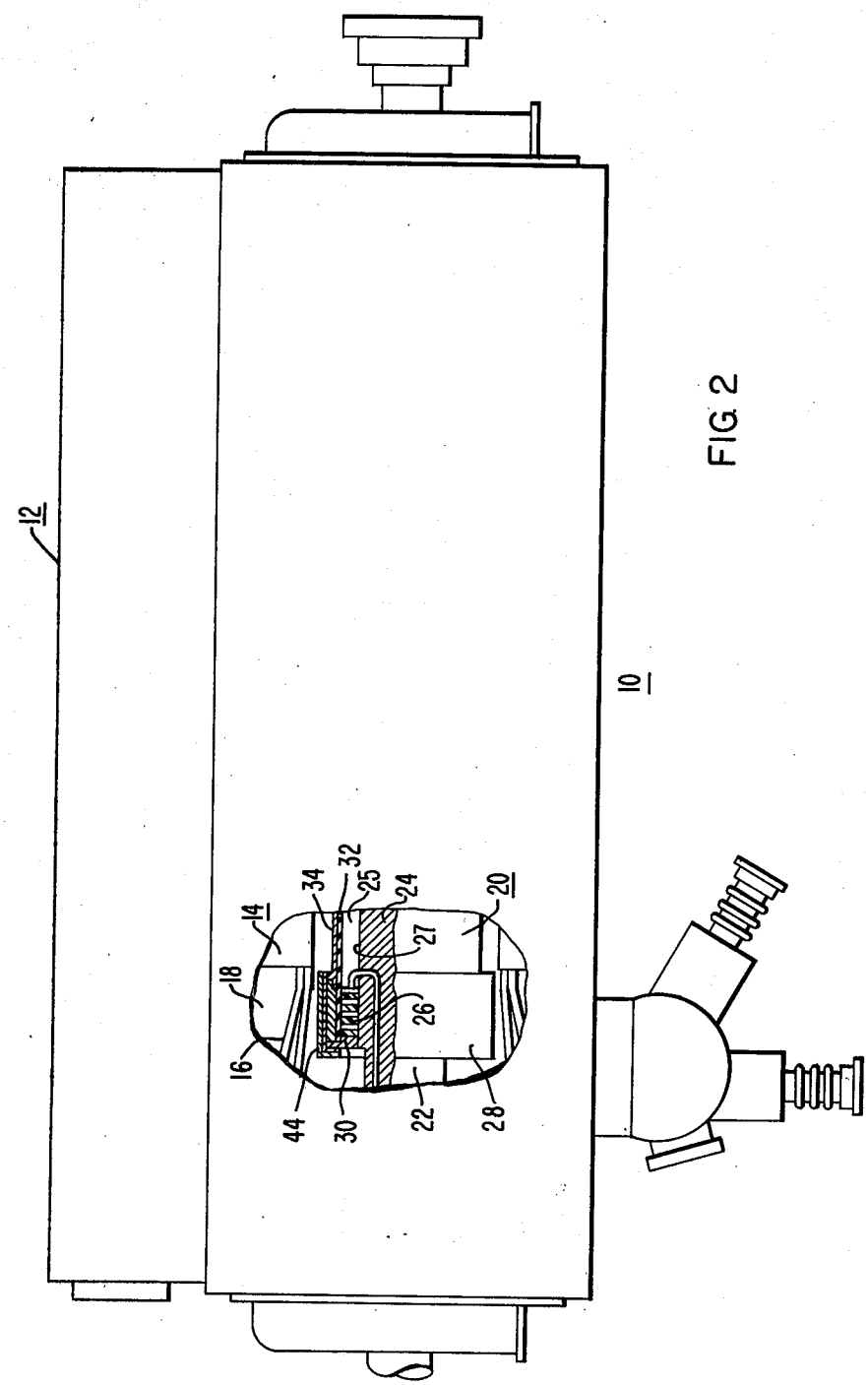
FIG. 2 is a partial transverse sectional view of the present invention.
Figure 3:
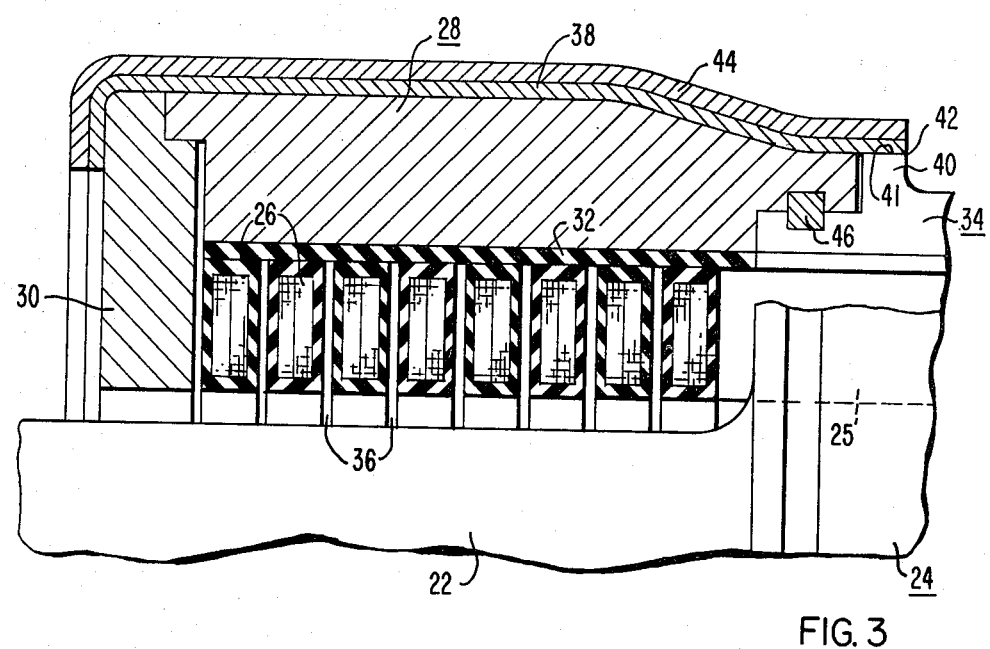
FIG. 3 is a transverse sectional view of one end of the rotor illustrated in FIG. 2.

FIG. 2 is a partial transverse sectional view of a turbine generator in which an improved conductor end turn restraining structure is provided. An enlarged illustration of the rotor body portion 24 and associated structure for restraining the end turn portions 26 of the field winding of FIG. 2 is shown in FIG. 3. The structure exemplified in FIG. 3 radially restrains the end turn portions 26 of the field winding and minimizes the heating losses normally occurring in the prior art's retaining ring. It should be understood that while eight end turn portions 26 which each preferably include hollow conductors for efficient internal cooling are illustrated, any suitable number of end turn portions may be utilized. The end turn portions 26 are electrically insulated from retaining ring structure 28 by insulation layer 32. Retaining ring structure 28, shown disposed in operating position, axially abutts and circumferentially surrounds the rotor body portion 24 and a longitudinal slot wedge structure 34. Although only a single longitudinal wedge structure 34 is shown, it is to be understood that the retaining ring structure 28 axially abutts and circumferentially surrounds a plurality of circumferentially separated wedge structures 34 in FIG. 2. Fitted insulating blocks 36 separate and maintain a fixed spatial relationship between the end turn portions 26 of the field winding.

Mantle 38, disposed radially about retaining ring structure 28 and end ring 30, constitutes highly conductive material whose preferable thickness is approximately one depth of electrical current penetration at the rotor induced surface current frequency (commonly 120 hertz) or more. Such thickness is, by example, approximately 0.25 inches for copper or 0.44 inches for aluminum alloys whose respective conductivities are 100% and 30% as determined by the International Annealed Copper Standard. Mantle 38 is preferably placed in intimate electrical contact with retaining ring structure 28 by roll forming or other suitable joining process. A relatively highly conductive material surrounding a relatively highly resistive material can be shown to be electrically dominant over and effectively shield the resistive material if the conductive material thickness is approximately one electrical skin depth. Mantle thicknesses less than the preferable one skin depth substantially reduce retaining ring structure 28's heating losses down to a preferable minimum thickness of one-half skin depth. Since rotor induced surface currents lie primarily within one skin thickness of the radially outer surface, highly conductive mantle 38 readily conducts those currents with minimal $I^2R$ heating losses. Radial extension portion 40 of slot wedge structure 34 preferably electrically contacts mantle 38 along outer surface 41 in an electrically parallel relation to its contact with retaining ring 28.

A thin sheet of extremely high conductivity material 42 such as silver is preferably placed at the interface between mantle 38 and outer, engagement surface 41. Thin sheet 42 is preferably brazed to mantle 38 prior to its roll formation with retaining ring structure 28 and is preferably softer than mantle 38 and radial extension's outer surface 41 so as to permit an interference (normally of shrink fit character) fit therebetween of low electrical resistivity and easy formation.

Support member 44 is preferably disposed in intimate contact with and radially about mantle 38 so as to provide rigid support therefor during high speed rotor rotation. Support member 44 preferably comprises a high strength, high resistivity, non-magnetic alloy such as ASTM-289 steel or Inconel ® 718. Support member 44 provides structural strength for mantle 38 since high conductivity materials are often relatively low in mechanical properties. Key 46 is circumferentially disposed about the rotor body portion 24 and longitudinal slot wedge structures 34 and lies radially within retaining ring structure 28. Key 46, when disposed in the illustrated operating position, locks the retaining ring structure 28, longitudinal slot wedges 34, and rotor body portion 24 in a fixed relationship.

When a substantially composite structure such as the intimately joined support member mantle includes a relatively highly resistive material surrounding a highly conductive material, it can be shown that the conductive material will electrically dominate and reduce electrical losses in the overlying resistive material if the resistive material's thickness is less than one electrical skin depth. It is to be understood that the conductive material will increasingly dominate the resistive material as the resistive material's thickness is decreased. For the present application support member 44 (constituting resistive material) should have a thickness no greater than required from structural support considerations. By example, support member 44 has a preferable radial thickness of less than one half skin depth of induced current penetration so as to permit copper mantle 38's electrical conductivity characteristics to dominate that of support member 44. Such domination compels most current to enter mantle 38 and result in little $I^2R$ heating losses in and thermal expansion of retaining ring structure 28 and support member 44. A typical thickness of such previously mentioned alloys of high strength, high resistivity, non-magnetic material used in support member 44 is about 0.5 inches with the depth of electrical current penetration or skin thickness being approximately 1.5 inches. An alternative to such high strength alloys in support member 44 includes a high strength fiber-reinforced resin such as carbon fiber in an epoxy matrix. Such materials could advantageously be formed and cured in place rather than being installed over and typically shrunk for the case where the support member constitutes an alloy.

Figure 4:
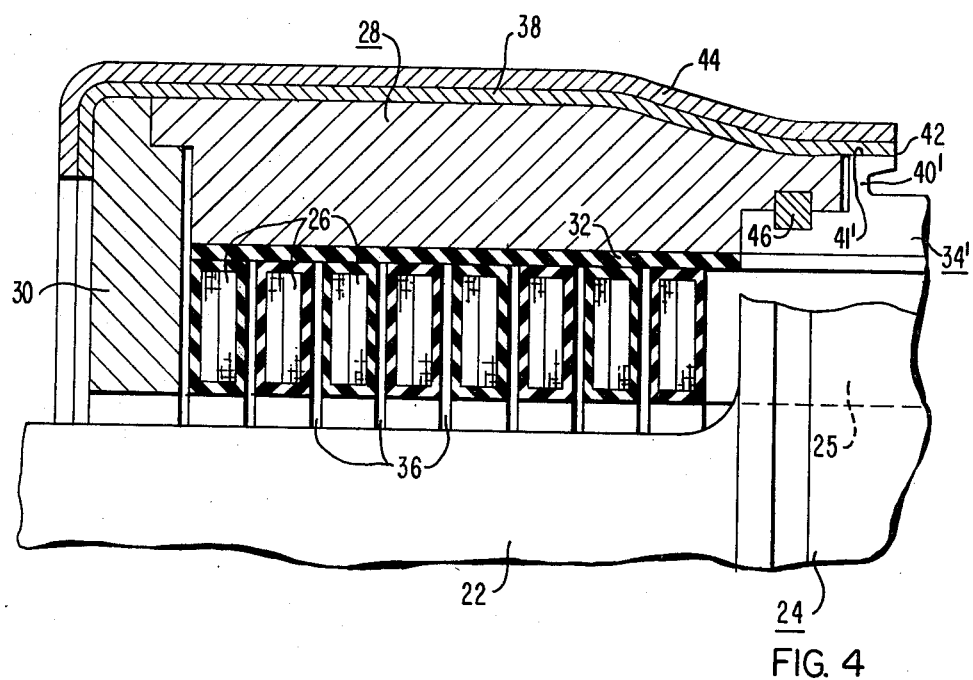
FIG. 4 is a transverse sectional view of an alternate embodiment to that illustrated in FIG. 3.

FIG. 4 illustrates an alternate embodiment of the conductive longitudinal slot wedge structure 34. The alternate wedge structure 34' has a radial extension portion 40' which includes a radially outer surface 41' of greater axial extent and area than the radial extension outer surface 41. Such increased contact between mantle 38 and conductive longitudinal slot wedge structure 34' can provide an electrical connection therebetween of lower resistivity than that illustrated in FIG. 3.

Mantle component 38 and support member component 44 preferably protrude radially inwardly at the outboard axial ends (one end is shown in FIGS. 3 and 4) of retaining ring structure 28 and end plate 30 to provide more effective electrical shielding and restrict relative axial movement among those components, retaining ring structure 28, and end plate 30.

It will now be apparent that an improved dynamoelectric machine has been provided in which a highly conductive mantle is circumferentially disposed about and in intimate contact with the retaining rings. Such relative disposition enables mantle 38 to affectively shield the retaining ring 28 from electriccal currents induced in the rotor body surface. Such shielding allows the utilizing, multiphase dynamoelectric machine to tolerate, to a greater extent, the effects of unbalance loads or faults.

I claim:
1. A dynamoelectric machine comprising:
   a cylindrical rotor body portion having a plurality of longitudinal slots disposed in its outer surface;
   an electrical winding cooperatively associated with the rotor body, said winding comprising a plurality of conductors, said conductors including longitudinal portions disposed in said rotor slots and end turn portions connecting said longitudinal portions at both axial ends of the rotor body, said end turn portions extending axially beyond the rotor body;

a retaining ring structure joined to each axial end of said rotor body, each retaining ring structure being disposed about the conductor end turn portions to restrain radially outward movement thereof during rotor rotation;

two highly conductive mantle structures each having an inner surface and an outer surface, said mantle structures being individually disposed about each of the retaining ring structures such that said inner surface is in intimate electrical contact with said retaining ring; and means for electrically connecting said mantle structure to said rotor surface, said electrical connecting means providing an electrical path separate from said retaining ring structure.

2. The dynamoelectric machine of claim 1, said electrical connection means comprising:

a plurality of electrically conductive wedges receivable in said slots for retaining said longitudinal conductor portions within said slots, each of said wedges having an extension which protrudes radially outward, said extension having a radially outer surface which is contactable with said mantle structure.

3. The dynamoelectric machine of claim 2 wherein said extensions' radially outer surface constitutes a highly electrically conductive material which is softer than said wedges and said mantle.

4. The dynamoelectric machine of claim 2 wherein said extensions' radially outer surface is contactable with a portion of the mantle's inner surface.

5. The dynamoelectric machine of claim 4 wherein contact between said wedge extension and said mantle constitutes an interference fit.

6. The dynamoelectric machine of claim 1 wherein each of said mantle structures includes a radially inward protrusion at the outboard axial ends of each retaining ring structure with each mantle structure's protrusion being in intimate electrical contact with said associated retaining ring's outboard axial end.

7. The dynamoelectric machine of claim 1 further comprising:

a cylindrical support member disposable about each of said mantle structures and in intimate contact with said mantle's outer surface, said support member providing radial retention of said mantle structure during rotor rotation.

8. The dynamoelectric machine of claim 7 wherein each of said support members constitutes conductive material and has a radial thickness which is less than one depth of electrical current penetration for electrical current induced on the rotor surface.

9. The dynamoelectric machine of claim 1 wherein each of said mantle structures have a thickness between said inner and outer surfaces of at least one half depth of electrical current penetration for electrical current induced on the rotor surface.

* * * * *